Figure 1:
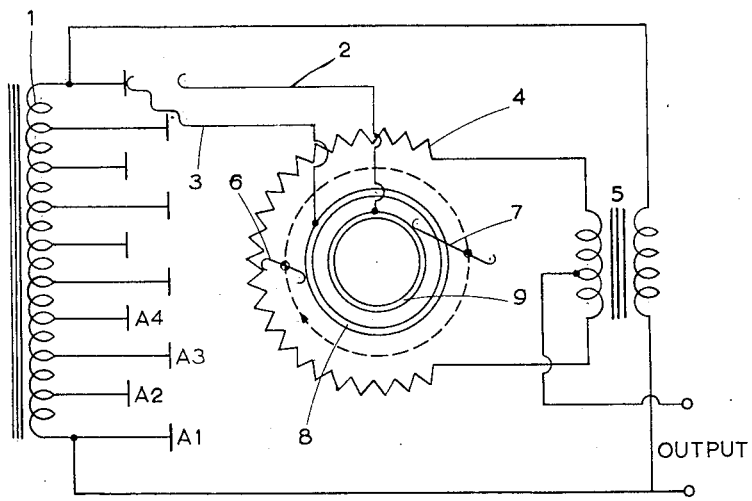

Oct. 2, 1962    S. C. ANSELL ETAL    3,056,916
INTERPOLATING DEVICE
Filed Dec. 31, 1958    2 Sheets-Sheet 1

Inventors
S.C.Ansell
R.H.Booth
R.Brown
D.P.Franklin
W.C.Rayward
Mascall Downing Seebold
Attys.

Oct. 2, 1962     S. C. ANSELL ETAL     3,056,916
INTERPOLATING DEVICE

Filed Dec. 31, 1958     2 Sheets-Sheet 2

Inventors
S. C. Ansell
R. H. Booth
R. Brown
D. P. Franklin
W. C. Rayward
By Glascock Downing Seebold
Attys.

United States Patent Office 3,056,916
Patented Oct. 2, 1962

3,056,916
INTERPOLATING DEVICE
Sidney Clifton Ansell, London, Richard Herbert Booth, Beaconsfield, Rex Brown, St. Georges, Weston-Super-Mare, Donald Peter Franklin, Wells, and William Clifford Rayward, West Horrington, Wells, England, assignors to Electric & Musical Industries Limited, Middlesex, England, a company of Great Britain
Filed Dec. 31, 1958, Ser. No. 784,383
Claims priority, application Great Britain Jan. 3, 1958
6 Claims. (Cl. 323—43.5)

This invention relates to interpolating devices.

In the position control servo systems, such as used for example in the automatic control of machine tools, it is frequently required to generate a voltage which is an analogue of the displacement of a part, the position of which is controlled. The voltage analogue is used for example as a feedback signal in the servo loop, to be compared with a command signal so that a servo motor may be controlled by the difference between the two signals in such a way that the servo motor tends to reduce the difference to zero. If the position control is to be accurate it is evident that the voltage analogue signal representing the actual position of the controlled part has to be generated with a high degree of accuracy. It is feasible to derive a voltage analogue representing the displacement of a part by coupling the part to the selector of a voltage divider, but if varying loads are not to upset the accuracy of the voltage division it is a practical necessity to use an inductive rather than a resistive voltage divider so that the voltage divider is in fact a variable auto-transformer. Difficulties in tapping an auto-transformer then lead to the problem that the voltage which can be derived by the selector varies in discrete steps so that the accuracy is not very high at positions of the selector intermediate those corresponding to the tapping points even if a make-before-break selector is used. To reduce this disadvantage, it was proposed in co-pending United States application Serial No. 484,202 to interpolate the voltage available between the taps on such an auto-transformer. To achieve this another transformer was used to derive a voltage representing a fraction of the voltage between adjacent taps on the first transformer, this fraction being added to that available at the aforesaid selector. According to the proposal of the aforesaid application, the interpolation was effected either by one or more other auto-transformers or by a rotary transformer of the variable linkage type. In the former case, the output voltage still exhibits discrete steps though these are of much smaller amplitude than the steps in the voltage available at the taps on the first auto-transformer. In the latter case, the rotary transformer has to be carefully constructed in order that the output from it should linearly correspond to rotation.

The object of the present invention is to obtain interpolation of an electrical analogue signal, without the disadvantages indicated in the preceding paragraph.

According to the present invention there is provided an interpolating device comprising a first voltage divider energisable from a source of reference voltage and having a series of reference points from which a series of voltages can be derived which are different fractions of the reference voltage, a series of contacts connected respectively to said reference points, and selector means operable to select among said contacts and derive voltage from a particular reference point, and a second voltage divider which includes other selector means operable to derive an incremental voltage which is a variable fraction of the voltage between said particular reference point and a neighbouring reference point, said second voltage divider comprising a resistor which is connected across the secondary turns of a transformer, of which the primary turns are energisable by the reference voltage.

Another object of the invention is to provide a potential divider, preferably of the construction indicated in the preceding paragraph which is of compact and robust mechanical construction. With this object in view there is provided, according to another aspect of the present invention, an interpolating device comprising a first voltage divider energisable from a source of reference voltage and having a series of reference points from which a series of voltages can be derived which are different fractions of the reference voltage, a series of contacts arranged in an arcuate path and connected respectively to said reference points, and selector means rotatable to select among said contacts and derive voltage from a particular reference point, a second voltage divider which includes other selector means rotatable to derive an incremental voltage which is a variable fraction of the voltage between said particular reference point and a neighbouring reference point, and wherein said selectors are mounted for rotation about a common axis and are coupled to rotate one relative to the other, with a desired velocity ratio, by means of epicyclic gears.

Figure 2:
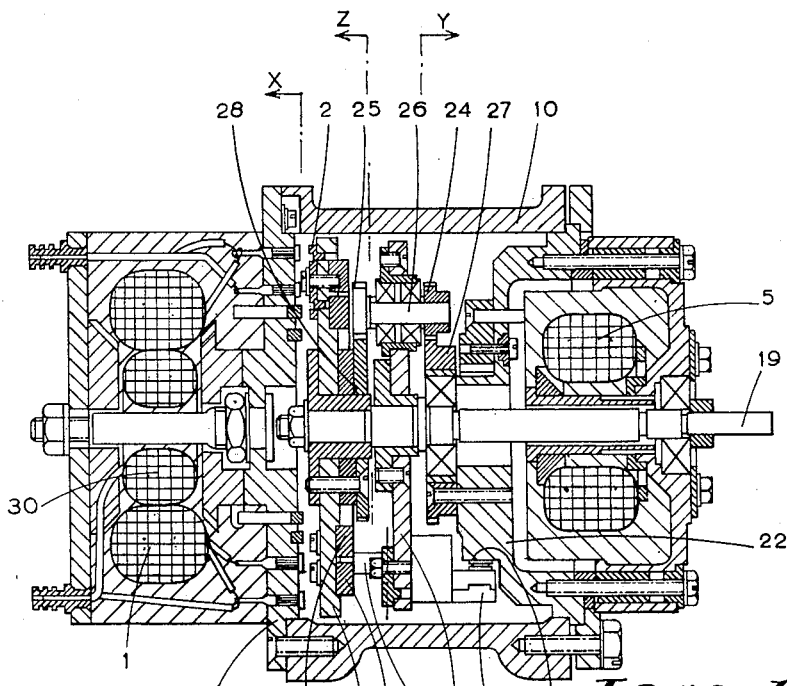

In order that the invention may be clearly understood and readily carried into effect, the invention will be described with reference to the accompanying drawings, in which:

FIGURE 1 illustrates the circuit diagram of one example of a voltage interpolating device according to the present invention, FIGURE 2 illustrates, in sectional elevation a preferred constructional form of the device illustrated in FIGURE 1, and FIGURES 3, 4 and 5 are sections on the lines XX, YY and ZZ respectively.

Referring to FIGURE 1, the interpolating device illustrated forms that part of a position control mechanism which is used to derive a voltage analogue representing the displacement of a part, the position of which is controlled. The device comprises an initial voltage divider in the form of an auto-transformer 1 to which is connected, at equi-spaced reference points, a series of taps denoted by the references A1, A2, A3. The auto-transformer 1 is wound on a toroidal core and the contacts A1, A2, A3, although shown in a straight line for convenience of illustration, are disposed in two circular tracks, one inside the other for example. The odd numbered taps A1, A3 are traversed by a selector 2, whilst the even numbered taps are traversed by a selector 3. The selectors 2 and 3 are in the form of rotary brushes carried by a shaft which is geared to the part whose position has to be controlled so that the shaft makes one complete revolution when the control part traverses its full range of displacement, or some predetermined fraction thereof. The selectors 2 and 3 are angularly aligned and are of make-before-break construction in the sense that the selector 3 contacts an even numbered tap before the selector 2 disengages the preceding odd numbered tap. The auto-transformer 1 is energized with a suitable alternating voltage of reference amplitude from a stabilised voltage source in any convenient manner.

Interpolation of the voltage available between taps of the auto-transformer 1 is produced by means of a resistive voltage divider which comprises a resistor 4, from which the output voltage is a continuously variable function of the position of its selector, and the resistor may, for example, be of ribbon band or slide wire type. The resistor 4 is arcuate having an effective arc of approximately 240°, and it is connected across the secondary winding of a transformer 5, the primary winding of which is energised from the same reference voltage source as the auto-transformer 1. However the step-down ratio of the transformer 5 is arranged to be such that the voltage across an 180° arc of the resistor 4 is equal to the voltage between adjacent taps on the auto-transformer 1. The resistor 4 is traversed by two selectors 6 and 7 which are mounted on a suitable shaft geared to the shaft which carries the selectors 2 and 3 in such a way that the selectors 6 and 7 rotate through half a revolution for a rotation of the selectors 2 and 3 from the mid point of one tap, say A1, to the mid point of the next tap say A2. The selector 6 is connected electrically to the selector 3 through the intermediary of a slip ring 8 whilst the selector 7 is connected electrically to the selector 2 through the intermediary of the slip ring 9. The output voltage of the interpolator is derived from between the lower end of the auto-transformer 1 and the mid point of the secondary winding of the transformer 5 and it can be shown that the output voltage is representative of the displacement of the part which is geared to the shafts of the selectors 2 and 3, the output voltage being without discrete steps.

Figure 3:
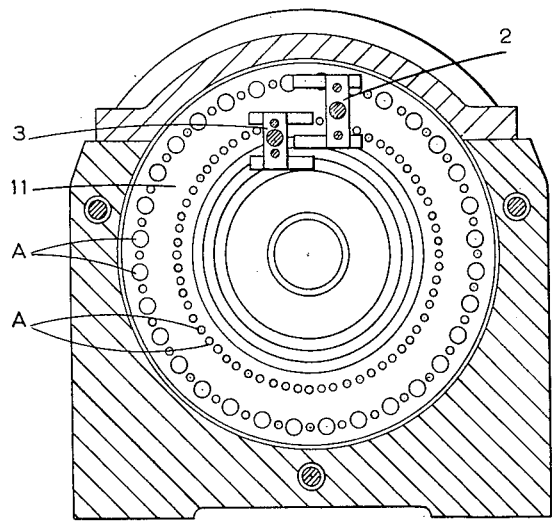
Figure 4:
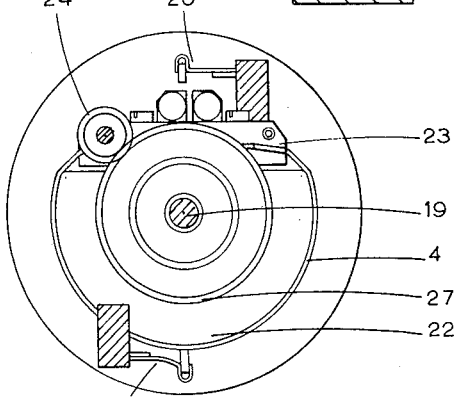
Figure 5:
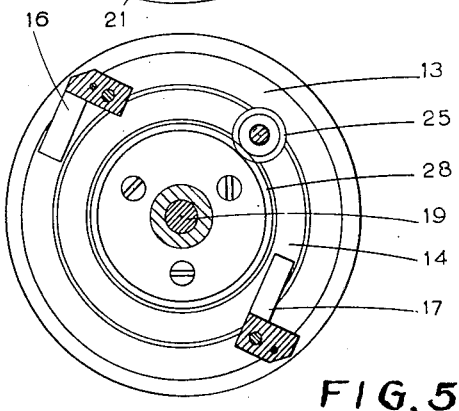

As shown in FIGURES 2 to 5, the autotransformer 1 and the transformer 5 are housed within a single casing 10, and the selectors 2, 3, 7 and 8 all rotate about a common axis, the required velocity ratio between the selectors 7 and 8 on the one hand, and the selectors 2 and 3 on the other hand being achieved by epicyclic gearing. The selectors 7 and 8 are called the high speed selectors, whereas the selectors 2 and 3 are called the low speed selectors. The odd numbered taps A1, A3, are constituted by an outer circle of studs on a panel 11, whilst the even numbered taps A2, A4 are constituted by an inner circle of studs on the same panel. The stud circles are traversed by the brushes which constitute the low speed selectors 2 and 3 respectively, which brushes are mounted on a disc 12 having two slip rings 13 and 14 secured on the opposite face of the disc from the brushes 2 and 3. As shown in FIGURE 3, "dummy" studs are provided in the stud circles between those which constitute the tap on the auto transformer 1, the "dummy" studs serving to ensure smooth movement of the brushes 2 and 3. It is also clear from FIGURE 3 that the practical form of the invention shown in FIGURES 2 to 5 has many more studs A than are indicated in the diagrammatic representation of FIGURE 1. The brushes 2 and 3 are connected electrically to the slip rings 13 and 14 respectively and the two slip rings are frictionally engaged by brushes 16 and 17 respectively, carried on a disc 18 which is fast on a shaft 19 which, it will be assumed, is geared to the part whose position has to be controlled. The brushes 16 and 17 are in turn connected to other brushes 20 and 21 mounted on the opposite side of the disc 18 from the brushes 16 and 17. The brushes 16 and 20 together correspond, say, to the selector 7 of FIGURE 1, whilst the brushes 17 and 21 together correspond to the selector 6. The ribbon resistor 4 (FIGURES 2 and 5) is held in close contact with a shoulder on a plate 22 secured to the casing, the ribbon being clamped in position by clamping means such as 23. Location of the brushes 20 and 21 is such that on rotation of the disc 18 they make frictional contact with the resistor 4. The disc 18 is, as aforesaid, fast on the shaft 19 and rotates with the shaft, and motion is transmitted from the shaft 19 to the disc 12 through the intermediary of two planetary gears 24 and 25 on a shaft 26 which is journalled in the disc 18. The planetary gear 24 meshes with a fixed gear 27 secured to the plate 22 whilst the planetary gear 25 meshes with a gear 28 secured to the disc 14, the latter disc being freely rotatable on the shaft 19, the gears 24 and 27 have slightly different velocity ratio from the gears 25 and 28 respectively, and by suitable choice of gear ratios it is arranged that the brushes 2 and 3 rotate from one tap, say A1, to the next tap in response to half a revolution of the shaft 19. The winding 30 within the auto-transformer 1 is a double wound choke, one winding of which is connected in the lead to the top of the auto-transformer 1 and the other winding of which is connected in the lead to the bottom of the auto-transformer 1.

What we claim is:

1. An interpolating device comprising a first voltage divider connected from one input terminal to another to allow energization from a source of reference voltage, said first voltage divider having a series of reference points from which a series of voltages can be derived which are different fractions of the reference voltage, a series of contacts connected respectively to said reference points, and selector means operable to select among said contacts and derive voltage from a particular reference point, and a second voltage divider which includes other selector means operable to derive an incremental voltage which is a continuously variable fraction of the voltage between said particular reference point and a neighbouring reference point, said second voltage divider comprising a transformer having primary turns connected from said one input terminal to another in parallel with said first voltage divider, a resistor which is connected across secondary turns of said transformer, said transformer having a step down ratio to cause the voltage across said resistor to be a fraction of said reference voltage.

2. An interpolating device comprising a first voltage divider connected from one input terminal to another to another to allow energisation from a source of reference voltage, having a series of reference points from which a series of voltages can be derived which are different fractions of the reference voltage, a series of contacts arranged in an arcuate path and connected respectively to said reference points, and selector means rotatable to select among said contacts and derive voltage from a particular reference point, a second voltage divider which includes other selector means rotatable to derive an incremental voltage which is a continuously variable fraction of the voltage between said particular reference point and a neighbouring reference point, said second voltage divider comprising a transformer having primary turns connected from said one input terminal to the other in parallel with said first voltage divider, a resistor which is connected across secondary turns of said transformer, said transformer having a step down ratio to cause the voltage across said resistor to be a fraction of said reference voltage and wherein said selectors are mounted for rotation about a common axis and are coupled to rotate one relative to the other, with a desired velocity ratio, by means of epicyclic gears.

3. A device according to claim 1, wherein said resistor is in the form of a ribbon band.

4. An interpolating device comprising a first voltage divider connected from one input terminal to another to allow energisation from a source of reference voltage, said first voltage divider having a series of reference points from which a series of voltages can be derived which are different fractions of the reference voltage, a series of contacts arranged in an arcuate path and connected respectively to said reference points, and selector means rotatable to select among said contacts and derive voltage from a particular reference point, a second voltage divider which includes other selector means rotatable to derive an incremental voltage which is a continuously variable fraction of the voltage between said particular reference point and a neighbouring reference point, said second voltage divider comprising a transformer having primary turns connected from said one input terminal to the other in parallel with said first voltage divider, a resistor connected across secondary turns of said transformer, said transformer having a step down ratio to cause the voltage across said resistor to be a fraction of said reference voltage, said selectors being mounted for rotation about a common axis, and gears coupling said first mentioned and said other selector means to rotate one relative to the other with a predetermined velocity ratio.

5. An interpolating device comprising a first voltage divider connected from one input terminal to another to allow energisation from a source of reference voltage, said first voltage divider having a series of reference points from which a series of voltages can be derived which are different fractions of the reference voltage, a series of contacts arranged in an arcuate path and connected respectively to said reference points, first selector means rotatable to select among said contacts and including brush means to engage said contacts and derive voltage from a particular reference point, a second voltage divider which includes other selector means rotatable to derive an incremental voltage which is a continuously variable fraction of the voltage between said particular reference point and a neighbouring reference point, said second voltage divider comprising a transformer having primary turns connected from said one input terminal to the other in parallel with said first voltage divider, a resistor which is connected across secondary turns of said transformer, said transformer having a step down ratio to cause the voltage across said resistor to be a fraction of said reference voltage said selector means being mounted for rotation about a common axis, a gear fixed in relation to both said selector means, a gear rotatable with said first selector means, two planetary gears journalled in a part rotatable with said second selector means, one of said planetary gears meshing with said fixed gear and the other planetary gear meshing with said rotatable gear, slip rings rotatable with said first selector means and electrically connected to the brushes thereof, and said part comprising brushes electrically connected with brushes of said second selector means and adapted to engage said slip rings, said gears being predetermined to cause said selector means to rotate one relative to the other with a predetermined velocity ratio.

6. A device according to claim 4, wherein the contacts of said first voltage divider are alternately disposed in two tracks and said first selector means comprises two brushes, one for each track, arranged to move selectively from one contact to the next in the respective track, either brush being arranged to engage either one contact before the other brush disengages the other contact, and wherein said selector means for the other voltage divider comprises two brushes electrically connected respectively to the brushes of said first selector means, an output terminal for the device being provided, electrically connected to the mid-point of said resistor.

References Cited in the file of this patent
UNITED STATES PATENTS

| | | |
|---|---|---|
| 1,992,146 | Craig | Feb. 19, 1935 |
| 2,255,727 | Allison | Sept. 9, 1941 |
| 2,832,036 | Cutler et al. | Apr. 22, 1958 |
| 2,843,822 | Scott | July 15, 1958 |